(12) United States Patent
Takahashi et al.

(10) Patent No.: US 6,675,925 B2
(45) Date of Patent: Jan. 13, 2004

(54) WORKING VEHICLE

(75) Inventors: Seiichi Takahashi, Izumi (JP); Ryohei Sumiyoshi, Sakai (JP); Isamu Kawai, Sakai (JP); Takashi Yasumi, Sakai (JP)

(73) Assignee: Kubota Corporation, Osaka (JP)

( * ) Notice: Subject to any disclaimer, the term of this patent is extended or adjusted under 35 U.S.C. 154(b) by 105 days.

(21) Appl. No.: 10/077,195

(22) Filed: Feb. 15, 2002

(65) Prior Publication Data

US 2003/0155735 A1 Aug. 21, 2003

(51) Int. Cl.[7] ............................................. B60R 17/30
(52) U.S. Cl. ....................... 180/266; 180/267; 180/343; 280/93.51; 280/98
(58) Field of Search ................................ 180/264, 266, 180/267, 343; 280/6.154, 93.51

(56) References Cited

U.S. PATENT DOCUMENTS

| | | | | |
|---|---|---|---|---|
| 4,749,205 A | * | 6/1988 | Takahashi et al. ..... | 280/124.116 |
| 5,046,577 A | | 9/1991 | Hurlburt ..................... | 180/266 |
| 5,322,309 A | * | 6/1994 | Hurlburt .............. | 280/124.113 |
| 5,340,138 A | * | 8/1994 | Hurlburt ................ | 280/93.504 |
| 5,447,320 A | * | 9/1995 | Hurlburt ................ | 280/93.504 |
| 5,447,321 A | * | 9/1995 | Hurlburt et al. ........ | 280/93.504 |
| 5,476,150 A | * | 12/1995 | Hurlburt et al. ........... | 180/53.7 |
| 5,476,276 A | * | 12/1995 | Hurlburt .................. | 280/137.5 |
| 5,769,180 A | * | 6/1998 | Momose et al. ............. | 180/424 |
| 5,836,415 A | * | 11/1998 | Barrowman ................. | 180/266 |
| 6,325,396 B1 | * | 12/2001 | Romig .......................... | 280/98 |
| 6,601,665 B2 | * | 8/2003 | Hurlburt .................. | 180/24.11 |

FOREIGN PATENT DOCUMENTS

JP        5636574         4/1981

* cited by examiner

*Primary Examiner*—Paul N. Dickson
*Assistant Examiner*—Toan To
(74) *Attorney, Agent, or Firm*—Webb Ziesenheim Logsdon Orkin & Hanson, P.C.

(57) ABSTRACT

A steering apparatus for a working vehicle is provided which is capable of steering dirigible wheels by increased steering angles while checking sideways sliding of the wheels on the ground. For this purpose, a pair of right and left intermediate cases are supported by right and left wheel supports of a vehicle body, each to be pivotable about a first steering axis extending substantially vertically. Each intermediate case supports an axle case in a position thereof opposed to the associated dirigible wheel, to be pivotable about a second steering axis extending substantially vertically. The axle case supports the associated dirigible wheel to be rotatable on an axle.

7 Claims, 9 Drawing Sheets

WORKING VEHICLE

BACKGROUND OF THE INVENTION

1. Field of the Invention

This invention relates to working vehicles such as tractors. More particularly, the invention relates to a steering apparatus mounted on such a working vehicle to steer the vehicle by changing directions relative to a vehicle body of right and left wheels.

2. Description of the Related Art

With an agricultural tractor as an example of working vehicles, a turn may be made with a small turning radius on a headland to provide advantages of making the headland small and moving quickly along the headland. For this purpose, a steering technique has been proposed as disclosed in Japanese Laying-open Utility Model Publication S56-36574 and U.S. Pat. No. 5,046,577. In this steering technique, wheels are supported at opposite ends of an axle member to be pivotable about vertical axes, and the axle member in turn is supported at a midpoint transversely of a vehicle body to be pivotable about a vertical axis. The vehicle is steered by changing directions relative to the vehicle body of the axle member and directions relative to the axle member of the right and left wheels. Thus, directions relative to the vehicle body of the wheels are changed by the combination of directional changes relative to the axle member of the wheels and directional changes relative to the vehicle body of the axle member. Compared with a case of employing only the directional changes relative to the axle member of the wheels, this steering mode provides a small turning radius even with an increased maximum steering angle of the wheels.

With the conventional steering technique noted above, when the vehicle is steered, the right and left wheels change directions relative to the vehicle body while sliding to large extents sideways on the ground. To enable the right and left wheels to roll relative to the vehicle body, the axle member has to be supported by the vehicle body to be pivotable also about an axis extending longitudinally of the vehicle body. This requires a complicated construction for attaching the axle member to the vehicle body, and this attaching construction requires a high degree of supporting strength, resulting in disadvantages in terms of cost and weight.

SUMMARY OF THE INVENTION

The object of this invention is to provide a steering apparatus for a working vehicle, which not only can steer wheels by increased steering angles but can reduce sideways sliding of the wheels and enable rolling of the wheels with a relatively inexpensive and lightweight construction.

The above object is fulfilled, according to this invention by a working vehicle comprising:

a vehicle body;

a pair of right and left dirigible wheels each having an axle;

a steering wheel for steering the pair of right and left dirigible wheels;

a pair of wheel supports arranged in right and left positions of the vehicle body;

intermediate cases each supported by one of the wheel supports to be pivotable relative to the one of the wheel supports about a first steering axis extending substantially vertically;

axle cases each attached to a side of one of the intermediate cases opposed to one of the dirigible wheels for supporting the one of the dirigible wheels on one of the axles, each of the axle cases being pivotable relative to one of the intermediate cases about a second steering axis extending substantially vertically; and a steering control mechanism operable in response to turning of the steering wheel for swinging each of the intermediate cases about the first steering axis and swinging each of the axle cases about the second steering axis, thereby steering the pair of dirigible wheels relative to the vehicle body.

The above construction provides the following advantages. When the steering wheel is turned, the steering control mechanism swings each of the right and left intermediate cases the first steering axis relative to the wheel support, and swings each of the right and left axle cases about the second steering axis relative to one of the intermediate cases. The direction relative to the vehicle body of the right and left wheels changes by both changes in the direction relative to the vehicle body of the intermediate cases and in the direction relative to the intermediate cases of the wheels. This results in a larger maximum steering angle for steering the right and left wheels than where the wheels are steered only about the second steering axes.

Further, each intermediate case is pivotably supported by a wheel support disposed at the left or right side of the vehicle body. The second steering axis serves as a pivotal axis of each dirigible wheel. The first steering axis provides a fulcrum about which the pivotal axis of this wheel is movable longitudinally of the vehicle body. That is, the distance from the fulcrum of movement to the wheel pivotal axis is shorter than the distance from the pivotal axis of an axle member which is a conventional fulcrum of movement to the wheel pivotal axis. Thus, the right and left wheels, when steered, slide sideways over reduced distances over the ground than in the prior art.

An axle member is supported by the vehicle body to be pivotable about a longitudinal axis of the vehicle body, and left wheel support is formed at one end of the axle member and a right wheel support formed at the other end of the axle member. Then, while the axle member is connected in an intermediate position thereof to the vehicle body only to be pivotable about the longitudinal axis of the vehicle body, the right and left wheels change directions by swinging about the second steering axes of the axle cases and swinging about the first steering axis of the intermediate cases, and roll (i.e. swing from side to side) relative to the vehicle body through the axle cases, intermediate cases and axle member.

Thus, with the steering apparatus for a working vehicle according to this invention, changes in the direction relative to the vehicle body of the right and left wheels are effected with larger steering angles than where the right and left wheels are swung only about the second steering axes. The vehicle may be turned with a small turning radius on a headland to diminish the headland. The vehicle may engage in an agricultural operation while running with advantage, such as moving quickly from a finishing point of a preceding patch to a starting point of a next patch.

Moreover, the vehicle may be steered while suppressing side slipping of the wheels on the ground to be less than in the prior art where the axle member swings in the middle position transversely of the vehicle body. Thus the vehicle may run steadily with a reduced chance of sideslipping and other defective running.

Further, the right and left wheels may roll from side to side to maintain the running vehicle body substantially horizontal regardless of irregularities or slopes of the ground. This is achieved by attaching the axle member forming the right and left wheel supports to the vehicle body through the simple mounting structure that only enables the axle member to swing up and down relative to the vehicle body. Thus, the apparatus according to this invention is inexpensive and lightweight.

In the above construction, when the right and left dirigible wheels are in a straight moving state, the second steering axis, preferably, is displaced from the first steering axis longitudinally of the vehicle body.

When changing the direction of a dirigible wheel relative to the vehicle body, the front or rear end of the wheel pivoting about the second steering axis would approach an inward member such as the vehicle body and eventually contact the inward member. Assume that the dirigible wheel is a front wheel and the second steering axis is displaced forwardly from the first steering axis when the wheel is in a straight moving state. When the wheel is turned outward from the straight moving state, the ground-engaging point of the wheel initially moves about the second steering axis and outwardly of the vehicle body. On the other hand, where the second steering axis is aligned with the first steering axis transversely of the vehicle body, the ground-engaging point of the wheel constantly moves about the second steering axis and inwardly of the vehicle body when the wheel is turned outward from the straight moving state. It follows that the former provides a larger angle for swinging the intermediate case about the first steering axis while the wheel moves from the straight running position to a position contacting the inward member.

Assume that the dirigible wheel is a rear wheel and the second steering axis is displaced rearwardly from the first steering axis when the wheel is in a straight moving state. When the wheel is turned outward from the straight moving state, the ground-engaging point of the wheel initially moves about the second steering axis and outwardly of the vehicle body. On the other hand, where the second steering axis is aligned with the first steering axis transversely of the vehicle body, the ground-engaging point of the wheel constantly moves about the second steering axis and inwardly of the vehicle body when the wheel is turned outward from the straight moving state. It follows that the former provides a larger angle for swinging the intermediate case about the first steering axis while the wheel moves from the straight running position to a position contacting the inward member. Thus, the right and left wheels may be steered by a larger maximum steering angle where the second steering axis is displaced from the first steering axis longitudinally of the vehicle body than where the second steering axis is aligned with the first steering axis transversely of the vehicle body when the wheels are in a straight running state.

With the construction according to this invention, the vehicle may be turned with a small turning radius also by the arrangement of the first steering axis and the second steering axis to increase the steering angle of the right and left wheels. This provides an advantage of further diminishing a headland.

Preferably, the steering control mechanism includes a control mechanism for linking one of the axle case and the intermediate case to the steering wheel, and an interlock mechanism for interlocking the other of the axle case and the intermediate case to the control mechanism.

When the steering wheel is turned, the right and left wheels are steered by the control mechanism swinging one of the axle case and the intermediate case and the interlock mechanism swinging the other in response to the swinging of one of the axle case and the intermediate case. That is, compared with linking the intermediate case and the axle case individually to the steering wheel, the steering control mechanism is simple in terms of both control and construction to control the axle cases and intermediate cases with turning of the steering wheel.

Thus, steering controls may be performed with the increased maximum steering angle of the right and left wheels with the steering control mechanism simple in construction and inexpensive to manufacture.

In one preferred embodiment of the invention, the interlock mechanism is the link type including a pivot link extending from the other of the axle case and the intermediate case to the wheel support.

By properly selecting a length or mounting angle of the pivot link, the intermediate case and axle case may be interlocked so that, for example, the axle case may swing in response to swinging of the intermediate case, and the axle case swings with swinging by unit angle of the intermediate case, by different angles according to positions of the intermediate case. The wheel may be steered by pivoting about the second steering axis in response to turning by unit angle of the steering wheel, to change directions relative to the vehicle body by different angles for a range of small steering angles and a range of large steering angles.

Thus, the link may determine whether a large change or a small change occurs in the direction of the wheel for an amount of turning of the steering wheel. The vehicle may make a small turn with the wheels turned by a large degree by turning the wheel steering only slightly. The vehicle may run without meandering, with little change occurring in the directions the wheels when the steering wheel is turned slightly. Such modes may be realized with a simple construction.

In a preferred embodiment of the invention, the first steering axis and the second steering axis extend parallel to each other, the dirigible wheels being drive wheels, and a transmission system for transmitting drive from the vehicle body to each of the dirigible wheels includes a gear transmission having a first spur gear rotatable about the first steering axis and a second spur gear rotatable about the second steering axis.

This construction provides the following advantages. When the steering apparatus is operated, the right and left intermediate cases swing about the first steering axes relative to the proximal drive case unit, and the right and left distal drive case units swing about the second steering axes relative to the intermediate cases, thereby placing the right and left wheels in a desired direction relative to the vehicle body to steer the vehicle. In a conventional construction, the wheels may be set to a desired direction relative to the vehicle body by turning each wheel only about one steering axis, or by swinging an axle supporting wheels at right and left ends thereof relative to the vehicle body and swinging the wheels relative to the axle. Compared with such a construction, the vehicle may be steered by turning the wheels by a desired maximum steering angle while diminishing a space required between each wheel and the vehicle body for turning the wheels by the desired maximum steering angle, and diminishing a maximum distance of movement of each wheel laterally of the vehicle body when the wheel is steered by the desired maximum steering angle.

Where drive is transmitted to the wheels by using gears rotatable on the first steering axis and the second steering axis, drive transmission is achieved with little possibility of defective transmission such as unequal speed transmission while enabling smooth swinging of the intermediate cases and distal drive case units. Where the first and second steering axes are nonparallel, bevel gear rotatable on the respective axes must be employed. Where the first and second steering axes are parallel, less expensive spur gears may be employed as gears rotatable on the respective steering axes.

The gear transmission may be mounted in the intermediate case, and may have a first transmission shaft rotatable about the first steering axis and interlocked at a lower end thereof to a second transmission shaft rotatable about the second steering axis.

With this construction, where the wheel drive case provides a lubricating oil bath therein, the gear mechanism may reliably be immersed in the oil bath for lubrication. Thus, this construction has an advantage that the transmission mechanism may be lubricated effectively.

In addition, the axle may have a large diameter spur gear mounted to be rotatable therewith, the large diameter spur gear being interlocked to an intermediate transmission shaft through a small diameter spur gear, the intermediate transmission shaft being interlocked to the second transmission shaft through a pair of bevel gears, whereby the axle is interlocked to the second transmission shaft with a decelerating effect.

Generally a pair of bevel gears are used as such a reduction device. This invention provides an intermediate transmission shaft interlocked through a small diameter spur gear to a large diameter spur gear mounted on the axle to be rotatable therewith. The intermediate transmission shaft and the second transmission shaft are interlocked through a pair of bevel gears. In this way, drive is transmitted from the second transmission shaft to the axle as decelerated by two stages.

Thus, drive may be transmitted from the small diameter spur gear to the large diameter spur gear with a small reduction ratio, and the large diameter spur gear may be reduced in size compared with the case of transmission only through a pair of bevel gears. As a result, a portion of the distal drive case unit extending into the wheel may include a circular main portion housing the large diameter spur gear, and a local projection projecting radially outwardly and housing the intermediate transmission shaft. The main portion may be reduced in size to enlarge a major portion of the space between the wheel and outer peripheries of the distal dive case unit, thereby suppressing clogging of the space with soil.

Other features, functions, effects and advantages of the present invention will be appreciated upon reading the following description with reference to the accompanied drawings.

DETAILED DESCRIPTION OF THE PREFERRED EMBODIMENTS

A preferred embodiment of this invention will be described hereinafter with reference to an agricultural tractor as one example of working vehicles.

Figure 1:
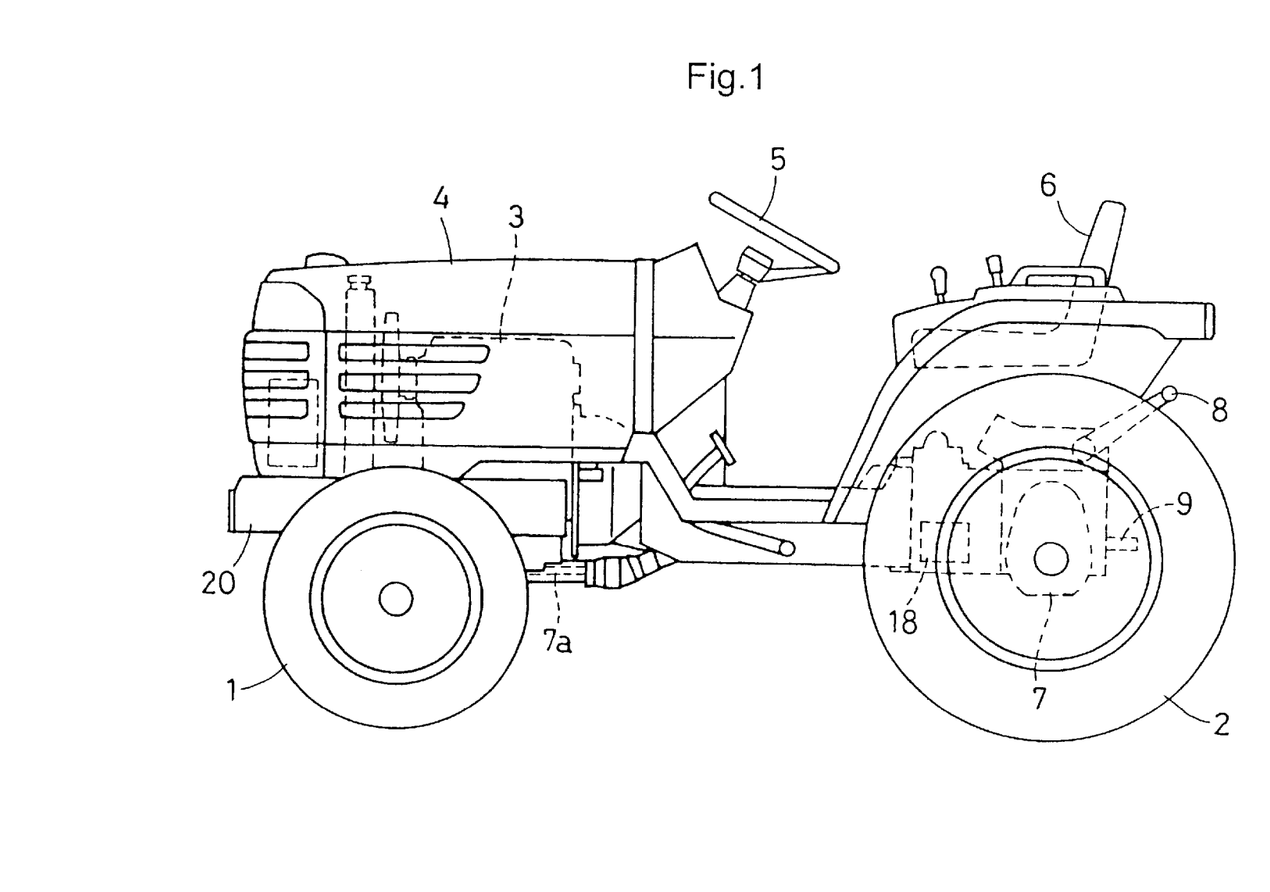
FIG. 1 is a side elevation of an agricultural tractor which is one example of working vehicles according to this invention.

As shown in FIG. 1, the agricultural tractor includes a vehicle body with a pair of right and left front drive wheels 1, a pair of right and left nondirigible rear drive wheels 2, a motor section having an engine 3 and an engine hood 4, and a driving platform having a steeling wheel 5 and a driver's seats 6. A transmission case 7 forms a rear portion of the vehicle body. Rearwardly of the transmission case 7 are lift arms 8 vertically pivotable by a lift cylinder (not shown), and a power takeoff shaft 9. A varied working implement such as a rotary plow is connected to the rear of the vehicle body to be vertically movable by the lift arms 8. The power takeoff shaft 9 is used to transmit torque to the working implement connected to the vehicle body.

As shown in FIGS. 2 through 5, the right and left front wheels 1 are supported at opposite ends of a wheel drive case 10 acting also as a front axle member and attached at a longitudinally intermediate position thereof to the front of the vehicle body. Specifically, the wheel drive case 10 includes a pair of front and rear hollow connecting shafts 11 and 12 arranged in the longitudinally intermediate position thereof. A front vehicle body frame 20 forming the front of the vehicle body supports a front support element 21 having a boss 21a, and the front connecting shaft 11 is fitted in the boss 21a to be rotatable about an axis X extending longitudinally of the vehicle body. The rear connecting shaft 12 is fitted in a boss 22a of a rear support element 22 supported by the front vehicle body frame 20, to be rotatable about the same axis X. That is, the right and left front wheels 1 are supported by the vehicle body to be capable of rolling relative thereto about the fore and aft axis X acting as a rolling axis. When one of the front wheels 1 descends about the axis X relative to the vehicle body, the other front wheel 1 ascends about the axis X relative to the vehicle body. Thus, when one of the right and left front wheels 1 sinks in a depression or rides on a bulge on the ground, or where the ground slopes sideways of the vehicle body, the right and left front wheels 1 will roll to maintain the vehicle body in a substantially horizontal sideways posture.

The wheel drive case 10 consists of five case units to form a steering apparatus according to this invention. These five case units are a proximal drive case unit 13 having the front and rear connecting shafts 11 and 12 in the intermediate position, a pair of right and left intermediate cases 14 acting as intermediate drive case units connected to opposite ends of the proximal drive case unit 13, and axle cases 15 acting as distal drive case units connected to the left intermediate case 14 and the right intermediate case 14. This steering apparatus steers the tractor by controlling the right and left front wheels 1 with a steering control mechanism S including a control mechanism 30 having a pair of tie rods 31 connected to the right and left intermediate cases 14, and an interlock mechanism 40 having pivot links 41 connected to the night and left axle cases 15. Its detailed construction will be described hereinafter.

Joint members acting as wheel supports 16 of the vehicle body are arranged at the opposite ends of the proximal drive case unit 13. The right and left intermediate drive case units each have a proximal end 14a defining a projecting spherical joint 14b sidably fitted in a recessed spherical joint 16a of the joint member of the proximal drive case unit 13, thereby being rotatably connected to the joint member. As a result, the left intermediate case 14 is supported by the left wheel support 16 to be pivotable about a first steering axis P1 extending vertically. The right intermediate case 14 is supported by the right wheel support 16 to be pivotable about a first steering axis P1 extending vertically. Each of the right and left distal drive case units is rotatably connected at a proximal end thereof to an upper support portion 14c and a lower support portion 14d at a free end of the intermediate drive case unit. Thus, the left axle case 15 is supported by the free end of left intermediate case 14 to be pivotable about a second steering axis P2 extending vertically, and supports the left front wheel 1 at a free end thereof to be rotatable about a wheel axis. The right axle case 15 is supported by the free end of right intermediate case 14 to be pivotable about a second steering axis P2 extending vertically, and supports the right front wheel 1 at a free end thereof to be rotatable about a wheel axis.

Figure 2:
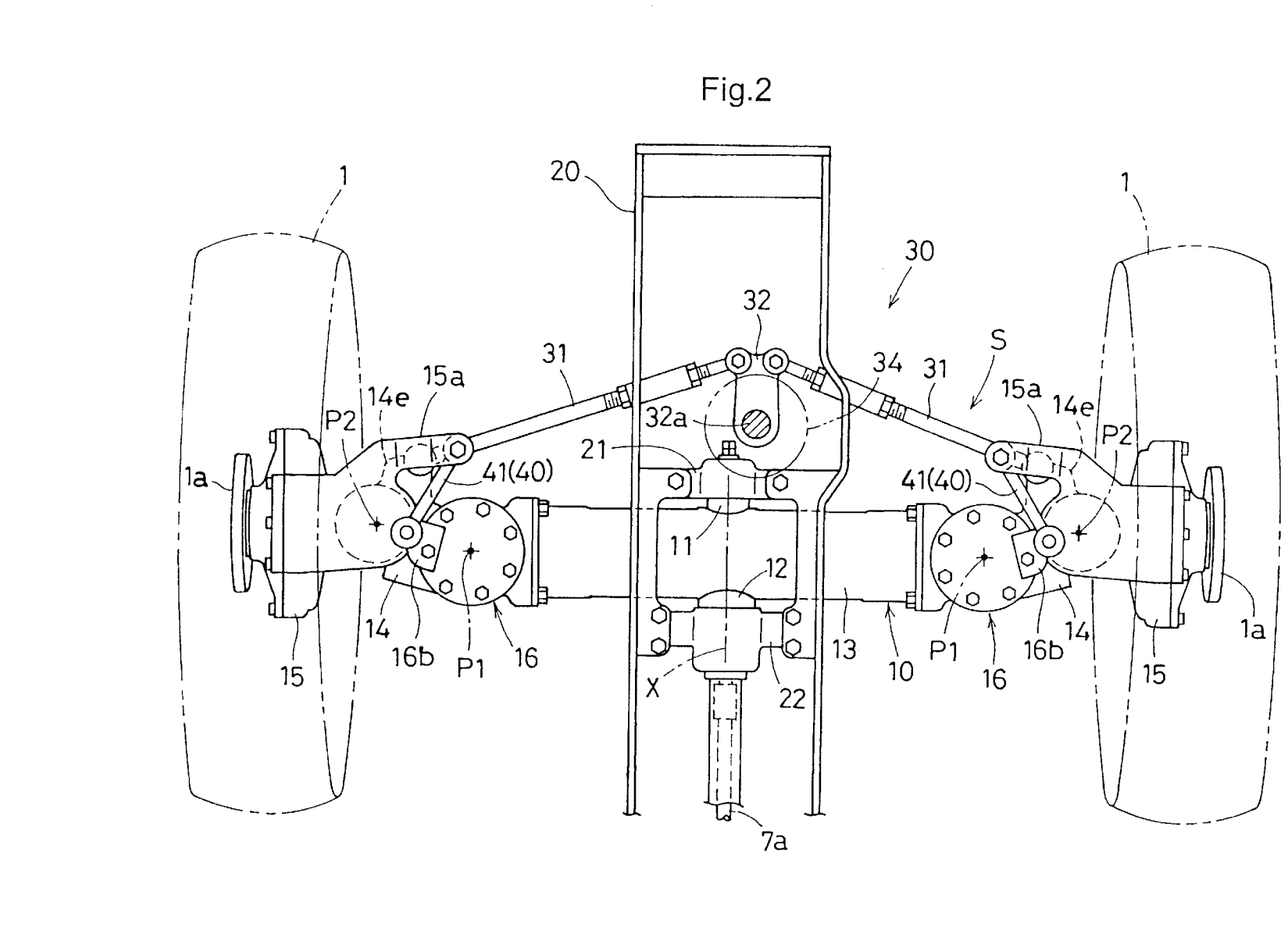
FIG. 2 is a plan view of a construction for attaching front wheels acting as dirigible wheels.

That is, both the left front wheel 1 and right front wheel 1 may be directed straight forward relative to the vehicle body and leftward or rightward from the straight running direction by swinging the intermediate case 14 forward or rearward about the first steering axes P1 relative to the wheel supports 16 and swinging the axle cases 15 forward or rearward about the second steering axes P2 relative to the intermediate cases 14.

The control mechanism 30 includes the tie rods 31 each connected at one end thereof connected to a knuckle arm 14e extending from one of the right and left intermediate cases 14. The other ends of tie rods 31 are pivotably connected to a free end of a pitman arm 32. The pitman arm 32 is pivotable about an axis 32a by a hydraulic power steering device 34 operable by the steering wheel 5. That is, the control mechanism 30 links the knuckle arms 14e of right and left intermediate cases 14 to the steering wheel 5. The right and left intermediate cases 14 are thereby swung about the first steering axes P1 by a turning operation of the steering wheel 5.

The interlock mechanism 40 includes a left interlocking mechanism having the pivot link 41 pivotally connected at one end thereof to a control arm 15a extending from the left axle case 15 for swinging the left axle case 15 about the second steering axis P2, and a right interlocking mechanism having the pivot link 41 pivotally connected at one end thereof to a control arm 15a extending from the right axle case 15 for swinging the right axle case 15 about the second steering axis P2. Each of the left interlocking mechanism and right interlocking mechanism is in the form of a link mechanism having the control arm 15a of axle case 15, and an arm 16b of the wheel support 16 on the vehicle body, with the pivot link 41 extending between the two arms 15a and 16b. When the intermediate case 14 is swung, its operating force swings the axle case 15 with the intermediate case 14, in the same direction as the intermediate case 14. Thus, the interlock mechanism 40 interlocks the right and left axle cases 15 to the control mechanism 30 to be swingable with the right and left intermediate cases 14.

As a result, the steering control mechanism S is capable of steering the right and left front wheels 1 in response to turning of the steering wheel 5, with the right and left intermediate cases 14 linked to the steering wheel 5 by the control mechanism 30, the left axle case 15 being interlocked to the left intermediate case 14 and the right axle case 15 to the right intermediate case 14 by the interlocking mechanism 40.

Thus, when the steering wheel 5 is turned to steer the tractor, its operating force and the action of steering control mechanism S swing the right and left intermediate cases 14 forward or rearward about the first steering axes P1 relative to the vehicle body, and swing the right and left axle cases 15 forward or rearward about the second steering axes P2 relative to the intermediate cases 14. The right and left front wheel 1 is thereby turned relative to the vehicle body, in a direction corresponding to a control position of the steering wheel 5.

Figure 5:
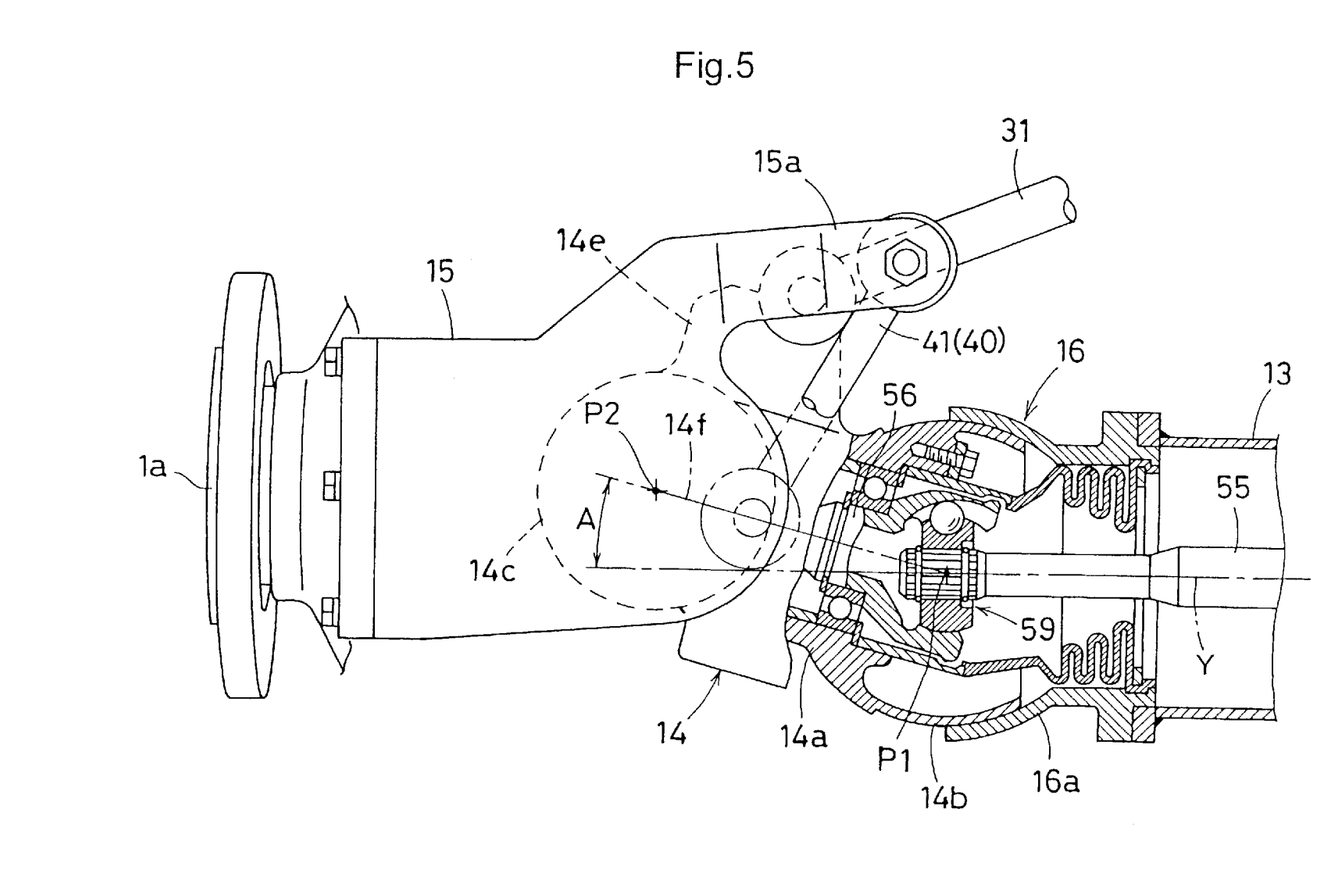
FIG. 5 is a view in cross section of an intermediate case support.
Figure 6:
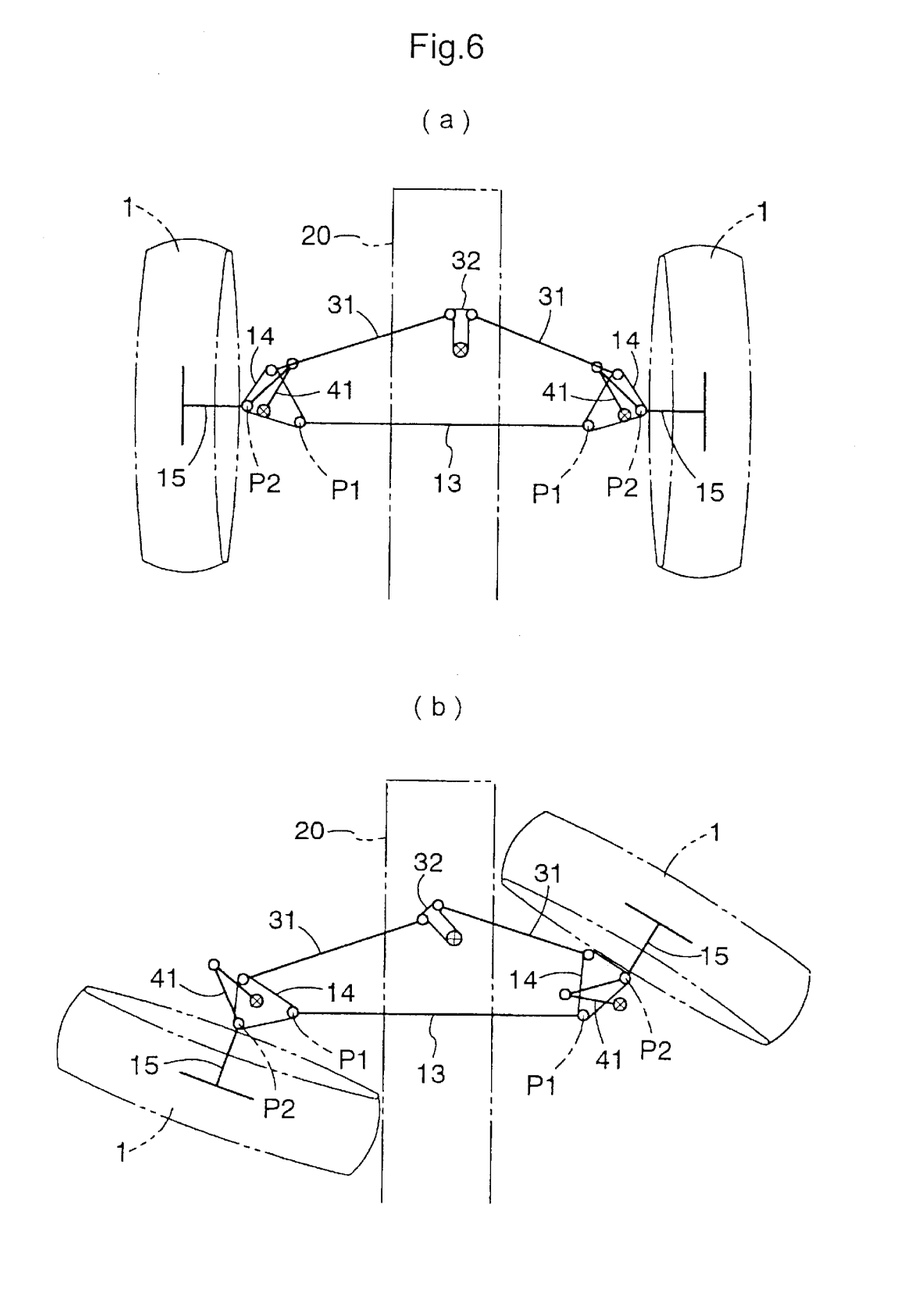
FIG. 6 is an explanatory view of front wheel steering.

That is, when the steering wheel 5 is turned to a straight running position, each of the right and left intermediate cases 14, as seen from FIG. 5, assumes a connecting posture with an upper transverse axis 14f thereof inclined forwardly by an angle A of approximately 15 degrees relative to an axis 13a of the proximal drive case unit 13, and each of the right and left axle cases 15, as seen from FIG. 6(a), assumes a connecting posture with an axle 1a extending transversely of the vehicle body. Thus, the right and left front wheels 1 are placed in a straight running direction relative to the vehicle body. At this time, with the intermediate cases 14 lying slightly forwardly of the wheel supports 16, the right and left second steering axes P2 are located slightly forwardly of the first steering axes P1.

When the steering wheel 5 is turned left or right from the straight running position, as shown in FIG. 6(b), one of the right and left intermediate cases 14 lying inwardly with respect to turning of the tractor is swung rearward relative to the wheel support 16, and the associated axle case 15 swung rearward relative to the intermediate case 14, from their respective positions for straight running. The intermediate case 14 lying outwardly with respect to turning of the tractor is swung forward relative to the wheel support 16, and the associated axle case 15 swung forward relative to the intermediate case 14, from their respective positions for straight running. The right and left front wheels 1 are turned leftward or rightward relative to the vehicle body to correspond to the direction of turning of the steering wheel 5. At this time, the larger the angle of turning of the steering wheel 5 is, the larger the steering angles of the right and left front wheels 1 are from the straight running direction. The front wheel 1 lying inwardly with respect to turning of the tractor has a maximum steering angle of approximately 90 degrees from the straight running direction, while the front wheel 1 lying outwardly with respect to turning of the tractor has a maximum steering angle of approximately 75 degrees from the straight running direction.

Figure 3:
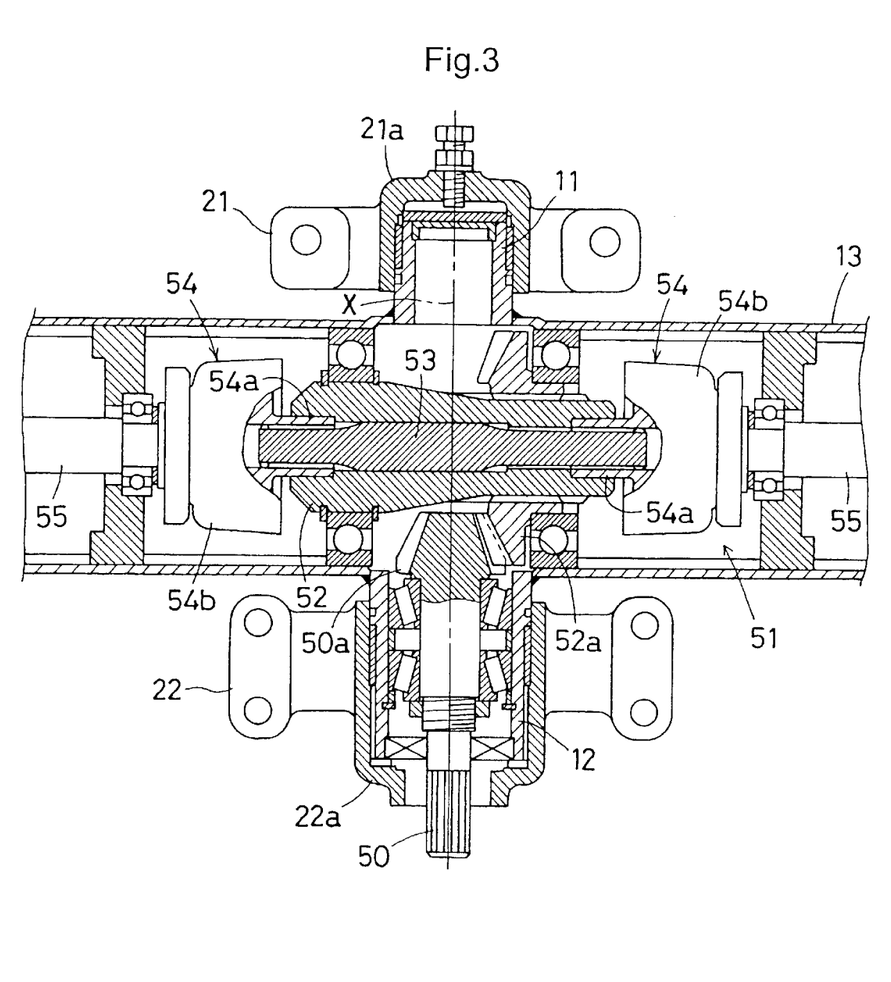
FIG. 3 is a sectional view of a front wheel drive case support.
Figure 4:
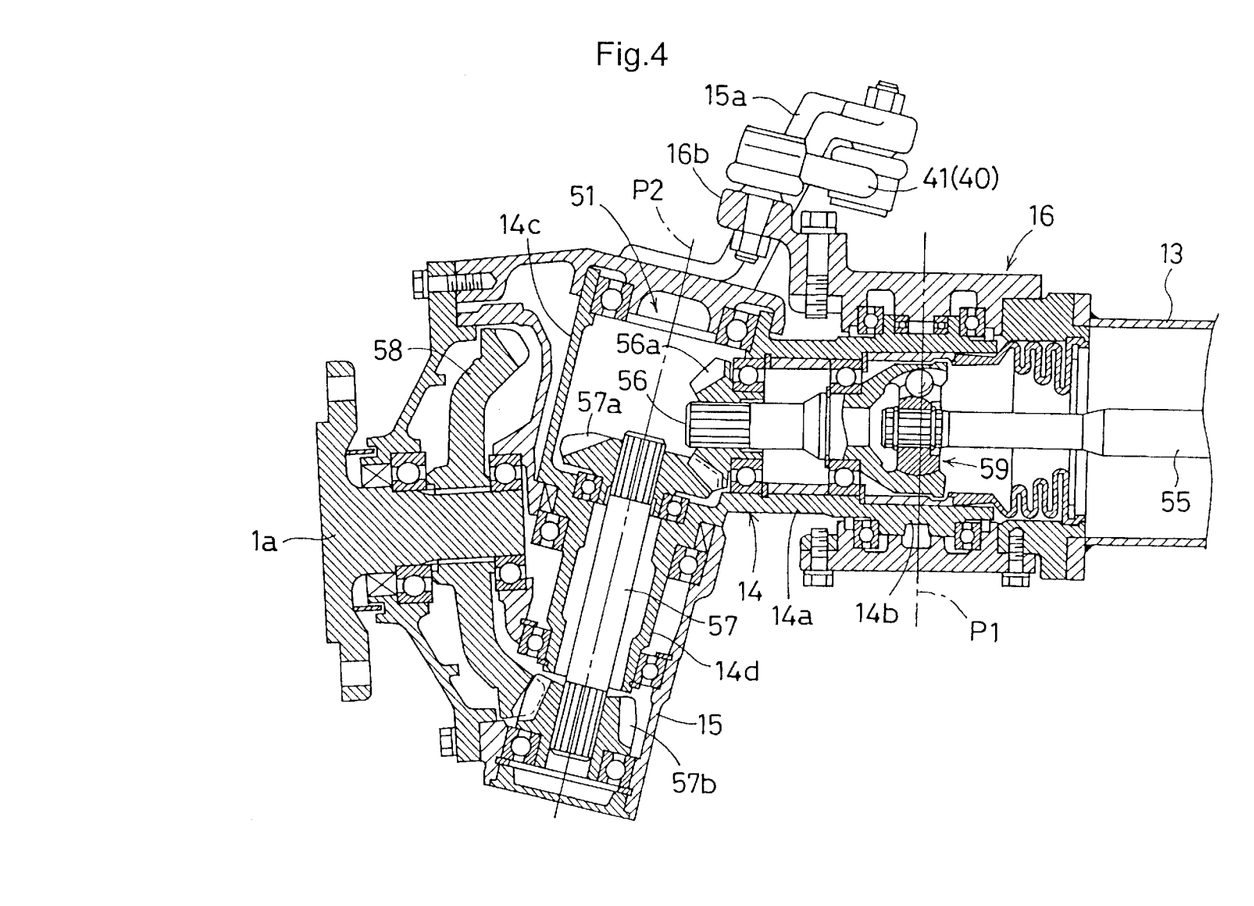
FIG. 4 is a view in vertical section of the front wheel support.

As shown in FIGS. 3 through 5, the rear connecting shaft 12 of the wheel drive case 10 receives an input shaft 50 disposed on the axis X, and a wheel drive mechanism 51 is mounted in the wheel drive case 10 for transmitting torque from the input shaft 50 to the right and left front wheels 1. The input shaft 50 is connected to a rotary shaft 7a (FIG. 1) extending forward from the transmission case 7 to receive front wheel driving torque from a propelling transmission (not shown) mounted in the transmission case 7.

The wheel drive mechanism 51 includes a drive mechanism portion for driving the left front wheel 1 and a chive mechanism portion for driving the right front wheel 1. The drive mechanism portions have a tubular transmission shaft 52, a distributing transmission shaft 53, a front wheel clutch 54 and a transmission shaft 55 arranged in the proximal drive case unit 13 of wheel drive cases 10, a horizontal transmission shaft 56 on an input side and a vertical transmission shaft 57 on an output side arranged in the intermediate drive case unit acting as the intermediate case 14, and an axle drive gear 58 disposed in the distal drive case unit acting as the axle case 15.

The tubular transmission shaft 52 has a bevel gear 52a splined to one end region thereof to be rotatable together. The bevel gear 52a is meshed with a bevel gear 50a formed on the end of the input shaft 50 disposed in the proximal drive case unit 13, to interlock the tubular transmission shaft 52 to the input shaft 50. The distributing transmission shaft 53 is mounted in and splined to the tubular transmission shaft 52 to be rotatable together. An end of distributing transmission shaft 53 is fitted in and splined to a tubular input shaft 54a of front wheel clutch 54 to be rotatable together. The front wheel clutch 54 has an output element 54b fitted on and splined to an end of the transmission shaft 55 to be rotatable together. Thus, torque is transmitted from the distributing transmission shaft 53 to the transmission shaft 55 through the front wheel clutch 54. The other end of the transmission shaft 55 is connected to the horizontal transmission shaft 56 on the input side in the intermediate drive case unit to be rotatable together by a universal joint 59 provided at an end of the horizontal transmission shaft 56. The horizontal transmission shaft 56 has a bevel gear 56a fitted on and splined to the other end thereof to be rotatable together. The vertical transmission shaft 57 has a bevel gear 57a fitted on and splined to an upper end thereof to be rotatable together. The horizontal transmission shaft 56 is interlocked to the vertical transmission shaft 57 through the bevel gears 56a and 57a meshed with each other. The vertical transmission shaft 57 has a bevel gear 57b fitted on and splined to a lower end thereof to be rotatable together. This bevel gear 57b is meshed with the axle drive gear 58. The right and left universal joint 59 are the ball type flexible about the first steering axes P1.

With this construction, the wheel drive mechanism 51 transmits torque of the input shaft 50 to the right and left front wheels 1, while allowing the intermediate cases 14 to swing, through the universal joints 59, about the first steering axes P1 relative to the wheel supports 16, and the axle cases 15 to swing, through the bevel gears 56a and 57a, about the second steer axes P2 relative to the intermediate cases 14. Thus, the right and left front wheels 1 are drivable wheels.

Referring to FIG. 1, the propelling transmission (not shown) mounted in the transmission case 7 has a front wheel change speed device 18 switchable between an equal speed position and an accelerating position. When the front wheel change speed device 18 is switched to the equal speed position, the right and left front wheels 1 are driven to rotate at an average peripheral speed substantially corresponding to that of the right and left rear wheels 2. When the front wheel change speed device 18 is switched to the accelerating position, the right and left front wheels 1 are driven to rotate at an average peripheral speed about twice the average peripheral speed of the right and left rear wheels 2. When the right and left front wheels 1 are steered left or right by large steering angles to cause the tractor to make a turn with a small turning radius, the front wheel change speed device 18 may be automatically switched to the accelerating position by a speed control device automatically operable based on a detection of a steering angle of front wheels 1, or may be switched manually to the accelerating position. In this way, the right and left front wheels 1 may be accelerated to make a turn with even a smaller turning radius.

Another Embodiment

Figure 7:
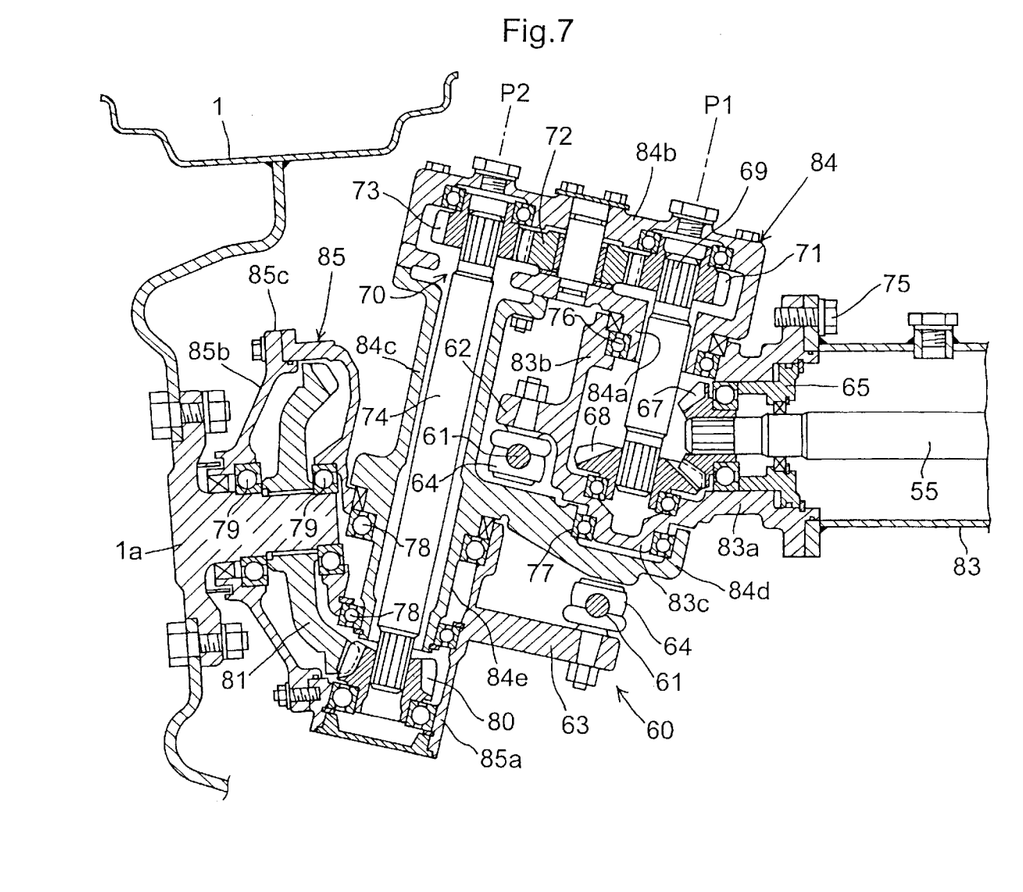
FIG. 7 is a view in vertical section of a portion corresponding to FIG. 2 and showing another embodiment of the invention.
Figure 8:
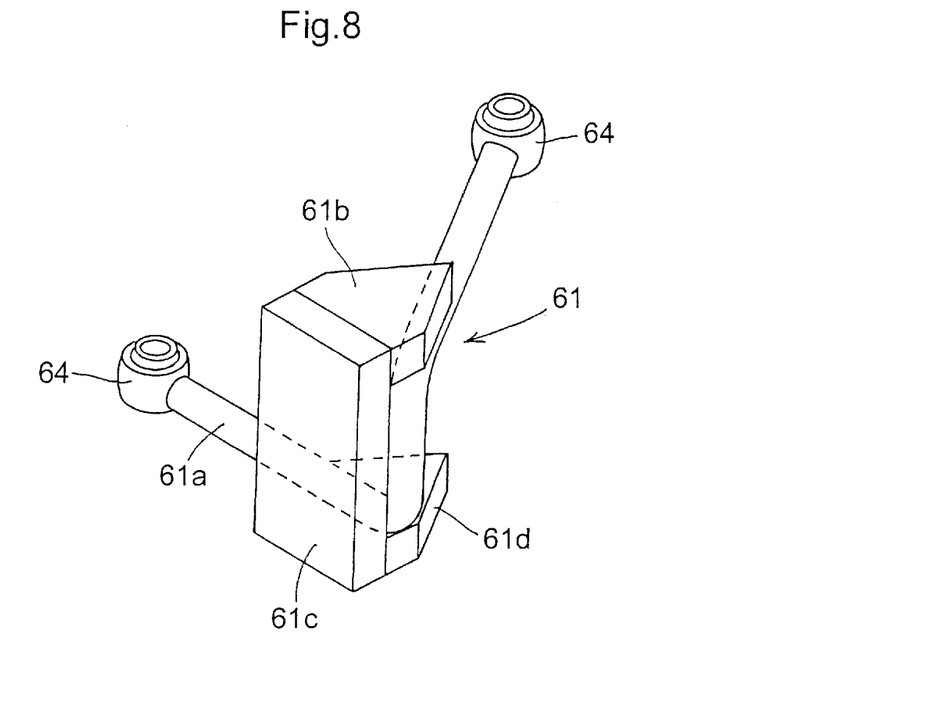
FIG. 8 is a perspective view of an entire connecting link shown in FIG. 7.

In another embodiment shown in FIGS. 7 and 8, the first steering axis P1 and second steering axis P2 extend parallel to each other.

In this embodiment, a proximal drive case unit 83 includes a main case body 83A formed of a pipe material and having the pair of front and rear connecting shafts 11 and 12 (see FIG. 2), and end cases 83a formed by casting and connected to opposite ends of main case body 83A by connecting bolts 75.

Each intermediate case 84 acting as an intermediate drive case unit includes an input case 84b formed by casting and having an input tubular portion 84a, and an output case 84c formed by casting and connected to the end of this input case 84b remote from the input tubular portion 84a. With the input tubular portion 84a extending into a support 83b at the upper end of end case 83a, the input case 84b is supported through a bearing 76 to be pivotable about the first steering axis P1 extending vertically. The output case 84c has a connecting portion 84d cast integrally therewith to project from a vertically intermediate position thereof A projecting end of the connecting portion 84d is fitted on a support 83c projecting toward the bottom of end case 83a, whereby the output case 84c is supported through a bearing 77 to be pivotable about the first steering axis P1. As a result, the left intermediate case 84 is supported by the left end of proximal drive case unit 83 to be pivotable about the first steering axis P1. Though not shown, the right intermediate case 84 also is supported by the right end of proximal drive case unit 83 to be pivotable about the first steering axis P1.

Each axle case 85 acting as a distal drive case unit includes an input case 85a, and an axle support case 85b connected in a side position thereof to one side of the input case 85a. The input case 85a is fitted on a support 84e formed on the bottom of the output case 84c of the intermediate case 84, and supported through a bearing 78 to be pivotable about the second steering axis P2 extending vertically and parallel to the first steering axis P1. An axle 1a extends to the axle support case 85b and input case 85a to be pivotably attached through bearings 79. Thus, the left axle case 85 is supported by the free end of left intermediate case 84 to be pivotable about the second steering axis P2, and supports the left wheel 1 to be rotatable through the axle 1a. Though not shown, the right axle case 85 also is supported by the free end of right intermediate case 84 to be pivotable about the second steering axis P2, and supports the right wheel 1 to be rotatable through an axle 1a.

Each of right and left link mechanisms 60 includes a fixed link 62 extending laterally outwardly of the vehicle body from between the upper support 83b and lower support 83c of the end case 83a of proximal drive case unit 83 and fixed to the proximal drive case unit 83 by casting integrally with the end case 83a, a movable link 63 cast integrally with and extending from the input case 85a of axle case 85 to be pivotable with the axle case 85 relative to the intermediate case 84, and a connecting link 61 having one end thereof pivotally connected to a free end of the movable link 63 through a ball joint 64, and the other end pivotally connected to a projecting end of the fixed link 62 through a ball joint 64. Thus, when the intermediate case 84 pivots about the first steering axis P1, the second steering axis P2 on which the axle case 85 is connected to the intermediate case 84 moves forward or rearward relative to the end case 83a. With the pivotal movement of the intermediate case 84, therefore, the axle case 85 is swung relative to the intermediate case 84 about the second steering axis P2. In each link mechanism 60, the axle case 85 is connected to the proximal drive case unit 83 such that, by setting a positional relationship among a connecting point of the fixed link 62 to the connecting link 61, a connecting point of the movable link 63 to the connecting link 61, and the second steering axis P2, when the intermediate case 84 pivots forwardly of the vehicle body, the axle case 85 also pivots forwardly of the vehicle body, and when the intermediate case 84 pivots rearwardly of the vehicle body, the axle case 85 also pivots rearwardly of the vehicle body.

The intermediate case 84 houses a transmission mechanism 70 including an input gear 71 in the form of a spur gear splined to an upper end of an output shaft 69 of the proximal drive case unit 83 to be rotatable together on the first steering axis P1, an intermediate gear 72 meshed with the input gear 71, an output gear 73 in the form of a spur gear meshed with the intermediate gear 72 and rotatable on the second steering axis P2, and an output shaft 74 splined at an upper end thereof to the output gear 73 to be rotatable therewith, and splined at a lower end to an input gear 80 of axle case 85. Thus, the transmission mechanism 70 transmits drive from the output shaft 69 of proximal drive case unit 83 to the output shaft 74 through the three spur gears 71, 72 and 73 constituting a gear transmission. The drive is transmitted from the output shaft 74 to the input gear 80 of axle case 85.

The connecting link 61 is constructed as shown in FIG. 8. Specifically, the connecting link 61 includes a main link body 61a in the form of a rod bent to have one end thereof disposed adjacent a lower side of fixed link 62 and the other end disposed adjacent an upper side of movable link 63, with an intermediate portion remaining out of contact with the connecting portion 84d of the intermediate case 84 when the latter pivots about the first steering axis P1. The ball joints 64 are attached to the opposite ends of the main link body 61a. The connecting link 61 further includes reinforcement plates 61b and 61c attached to the intermediate portion of main link body 61a to reinforce bends of main link body 61a.

As shown in FIG. 7, each of the right and left end cases 83a of proximal drive case unit 83 has an oil seal mechanism 65 disposed at an end thereof for dividing the interior space of proximal drive case unit 83 into a transmission upstream portion adjacent the vehicle body, and a transmission downstream portion accommodating the output shaft 69, and oil-sealing the downstream portion from the upstream portion. The intermediate case 84 contains lubricating oil for the transmission mechanism 70, with an oil level reaching the gears 71, 72 and 73, and the oil being prevented from flowing through the end case 83a to the main case body 83A of proximal drive case unit 83.

Further Embodiment

Figure 9:
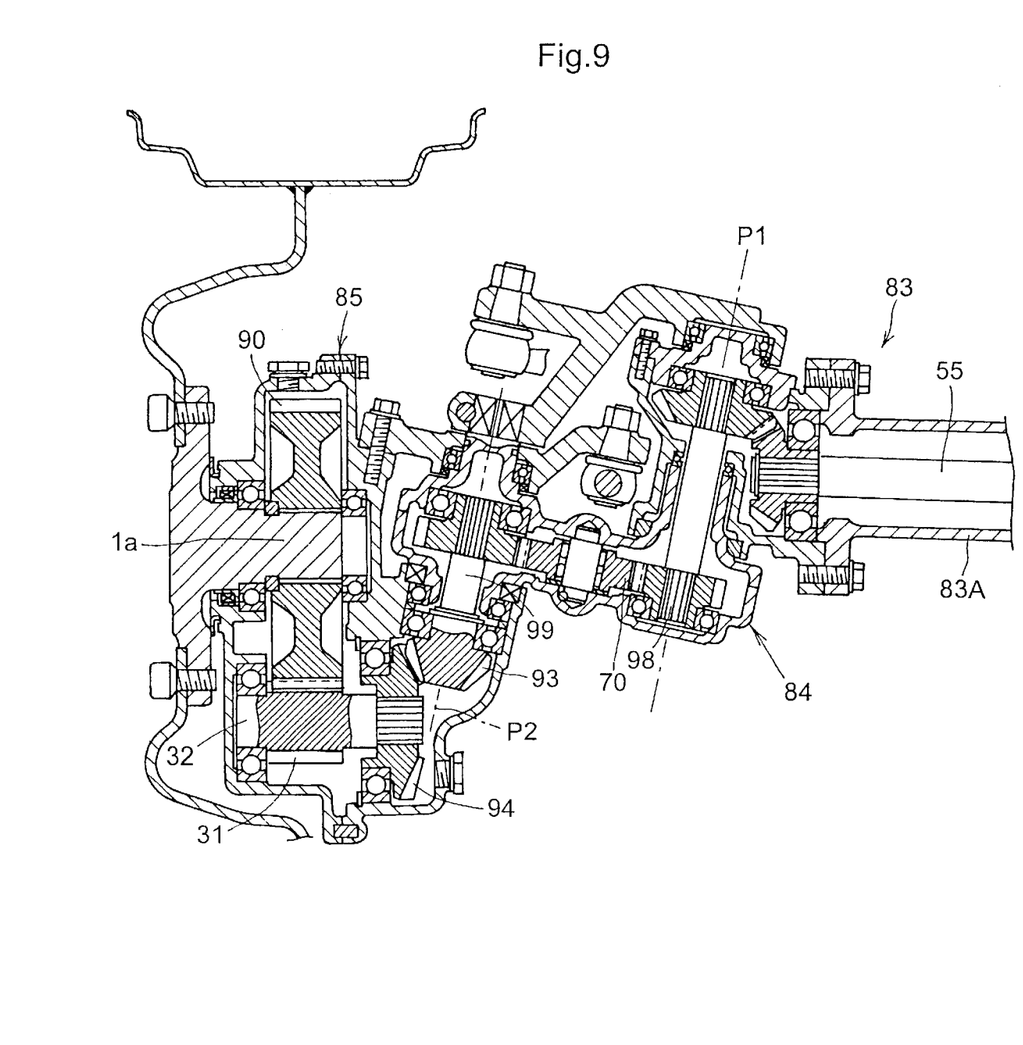
FIG. 9 is a view in vertical section of a portion corresponding to FIG. 2 and showing a further embodiment of the invention.

FIG. 9 shows a further embodiment of this invention.

This embodiment provides a mechanism for interlocking the axle 1a, with a decelerating effect, to a second transmission shaft 99 acting as an output shaft of the transmission mechanism 70 disposed in each intermediate case 84. This mechanism includes a spur gear 90 of large diameter mounted on the axle 1a to be rotatable together, an intermediate transmission shaft 92 interlocked to the spur gear 90 of large diameter through a spur gear 91 of small diameter, and a pair of bevel gears 93 and 94 for interlocking the intermediate transmission shaft 92 to the output shaft 74. The intermediate case contains a gear mechanism for interlocking a first transmission shaft 98 rotatable on the first steering axis PI and the second transmission shaft 99 rotatable on the second steering axis P2. The first transmission shaft is interlocked at a lower end thereof to the second transmission shaft. The proximal drive case unit 83 defines a lubricating oil bath in a lower portion of the main case body 83A.

With this construction, the gear mechanism may be lubricated reliably as immersed in the oil bath. Thus, this is advantageous in providing excellent lubrication for the transmission mechanism.

While several samples of the working vehicles according to this invention have been described hereinbefore, the invention is not limited to the embodiments illustrated but may be varied or modified in a number of ways.

For example, the right and left front wheels 1 are dirigible drive wheels in each of the foregoing embodiments, but the invention is applicable also where dirigible wheels are the right and left rear wheels 2. Whether dirigible wheels are the front wheels or rear wheels, dirigible wheels can be non-drive wheels.

In the foregoing embodiments, the control mechanism 30 of steering control mechanism S links the right and left intermediate cases 84 to the steering wheel 5. Instead, the control mechanism 30 may link the right and left axle cases 85 to the steering wheel 5. In this case, the interlock mechanism 40 swings the intermediate case 84 in response to swinging of the axle cases 85. In the foregoing embodiments, the control mechanism 30 of steering control mechanism S links the right and left intermediate cases 84 or the axle cases 85 to the steering wheel 5 by the hydraulic power steering device 34. The hydraulic power steering device 34 may be replaced with a mechanical steering device or electric power steering device.

Finally, the agricultural tractor illustrated is only one example of working vehicles. This invention is applicable to various other working vehicles such as lawn mowers.

What is claimed is:

1. A working vehicle comprising:

a vehicle body;

a pair of right and left dirigible wheels each having an axle;

a steering wheel for steering said pair of right and left dirigible wheels;

a pair of wheel supports arranged in right and left positions of said vehicle body;

intermediate cases each supported by one of said wheel supports to be pivotable relative to said one of said wheel supports about a first steering axis extending substantially vertically;

axle cases each attached to a side of one of said intermediate cases opposed to one of said dirigible wheels for supporting said one of said dirigible wheels on one of said axles, each of said axle cases being pivotable relative to one of said intermediate cases about a second steering axis extending substantially vertically; and a steering control mechanism operable in response to turning of said steering wheel for swinging each of said intermediate cases about said first steering axis and swinging each of said axle cases about said second steering axis, thereby steering said pair of dirigible wheels relative to said vehicle body.

2. A working vehicle as defined in claim 1, wherein, when said right and left dirigible wheels are in a straight moving state, said second steering axis is displaced from said first steering axis longitudinally of said vehicle body.

3. A working vehicle as defined in claim 1, wherein said steering control mechanism includes a control mechanism for linking one of said axle case and said intermediate case to said steering wheel, and an interlock mechanism for interlocking the other of said axle case and said intermediate case to said control mechanism.

4. A working vehicle as defined in claim 3, wherein said interlock mechanism includes a pivot link extending from the other of said axle case and said intermediate case to said wheel support.

5. A working vehicle as defined in claim 1, wherein:
said first steering axis and said second steering axis extend parallel to each other, said dirigible wheels being drive wheels; and
a transmission system for transmitting drive from said vehicle body to each of said dirigible wheels includes a gear transmission having a first spur gear rotatable about said first steering axis and a second spur gear rotatable about said second steering axis.

6. A working vehicle as defined in claim 5, wherein said gear transmission is mounted in said intermediate case, and has a first transmission shaft rotatable about said first steering axis and interlocked at a lower end thereof to a second transmission shaft rotatable about said second steering axis.

7. A working vehicle as defined in claim 6, wherein said axle has a large diameter spur gear mounted to be rotatable therewith, said large diameter spur gear being interlocked to an intermediate transmission shaft through a small diameter spur gear, said intermediate transmission shaft being interlocked to said second transmission shaft through a pair of bevel gears, whereby said axle is interlocked to said second transmission shaft with a decelerating effect.

* * * * *